April 28, 1959     J. H. SEATON     2,884,042

WHEEL ASSEMBLY

Filed May 16, 1956

INVENTOR.
JOHN H. SEATON
BY
ATTY.

United States Patent Office 2,884,042
Patented Apr. 28, 1959

2,884,042
WHEEL ASSEMBLY

John H. Seaton, Troy, Ohio, assignor to The B. F. Goodrich Company, New York, N.Y., a corporation of New York Application May 16, 1956, Serial No. 585,355

5 Claims. (Cl. 152—404)

This invention relates to a multi-section wheel assembly suitable for mounting tubeless tires. More particularly it relates to a sectional wheel assembly incorporating an improved seal for preventing leakage of air between the registering faces of the wheel sections from a tubeless tire mounted on the wheel assembly. The wheel assembly of this invention is particularly suited for mounting aircraft tires or tires for heavy automotive vehicles where sectional rim assemblies are customarily used.

According to the present invention an annular continuous sealing ring of elastic deformable rubber-like material and having a generally rectangular cross sectional shape is interposed between and engaged by opposing sealing surfaces at the parting faces of mating wheel sections. The sealing surfaces are shaped to maintain the ring under diagonal transverse compression throughout its length by distorting the ring across two opposed radially-offset annular corners of the ring. In this manner, the ring provides an effective barrier to prevent leakage of the inflation air between the wheel sections from a tubeless tire mounted on the assembled wheel sections, even while the wheel assembly is subjected to forces which tend to separate the wheel sections.

The invention will be further described with reference to the accompanying drawings which illustrate a wheel assembly made in accordance with and embodying this invention.

Figure 1:
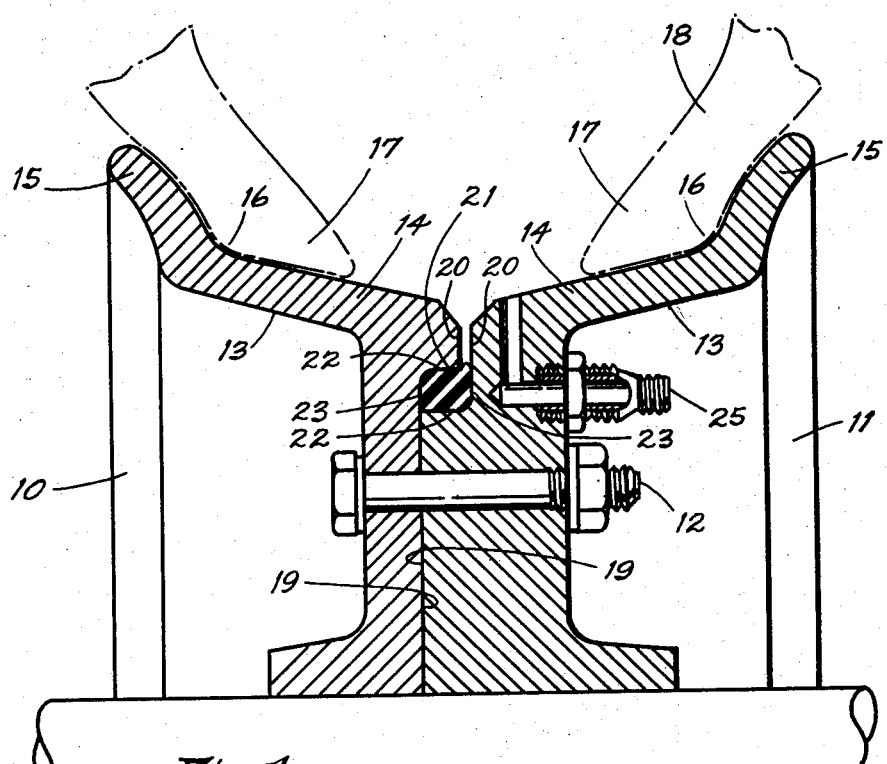
Fig. 1 is a partial diametrical cross-section of a wheel assembly with a seal of the type provided by this invention.

The wheel assembly of Fig. 1 is formed with a pair of mating complementary wheel sections 10 and 11 secured axially to each other by tie bolts 12. Each of the wheel sections includes a peripheral rim flange 13 composed of a generally cylindrical portion 14 and a generally radially outwardly directed portion 15. The junction of the cylindrical flange portion 14 and the radial flange portion 15 on the outer surface of the rim define bead seats 16 to receive the axially spaced beads 17 of a tubeless tire 18 mounted on the wheel assembly. The tire in Fig. 1 is indicated in chain dotted lines and may be of any suitable construction for a tubeless tire. The tire may be inflated by a conventional valve 25 mounted as shown in wheel section 11.

Each wheel section in this embodiment of the invention includes a radially inner annular mating surface 19 and a radially outer mating surface 20 which are axially off-set from each other. The radially inner surfaces 19 of the wheel sections register with each other in abutting relation in the final assembly, whereas the radially outer surfaces 20 are spaced slightly apart from each other.

The interface of the registering surfaces 19 of the assembled wheel sections communicates with a portion of the peripheral flanges 13 intermediate the bead seats 16 and is therefore in communication with the inflation chamber of tire 18 supported on the rim flanges.

To prevent leakage of air from the tire 18, an annular sealing ring 21 is interposed between the wheel sections and is engaged by a pair of mutually perpendicular sealing surfaces 22 and 23 on each wheel section located between and connecting the axially off-set surfaces 19 and 20. The sealing surface 23 is disposed radially relative to the rotational axis of the wheel, and the surface 22 is disposed axially and concentrically relative to the rotational axis of the wheel. In the assembled condition of the wheel sections 10 and 11, the corresponding axial surfaces 22 concentrically overlap each other in radially spaced relation (see Fig. 3) so that the sealing surfaces 22 and 23 of both wheel sections cooperate to define an annular sealing cavity to receive sealing ring 21. The annular sealing ring is preferably of elastic deformable rubber-like material and substantially fills the cavity.

Figure 2:
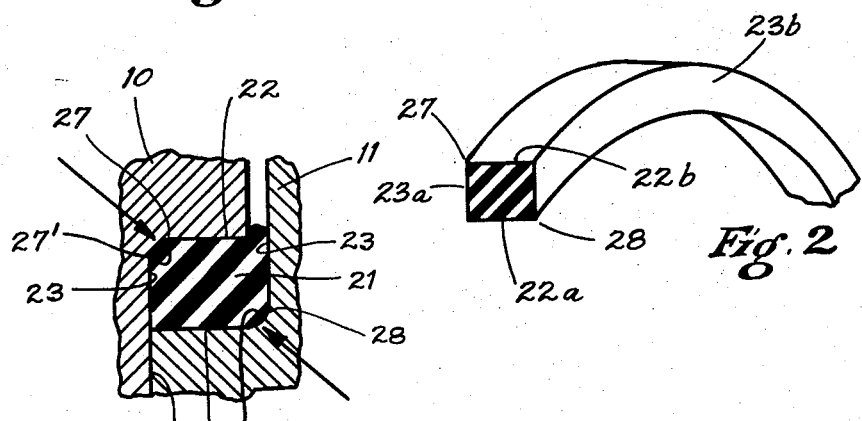
Fig. 2 is a fragmentary view in perspective showing the preferred cross sectional shape for the sealing ring prior to its installation in an assembly like Figure 1.
Figure 3:
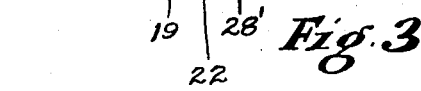
Fig. 3 is a fragmentary view showing the manner in which the sealing ring is distorted by the sealing surfaces of the wheel sections.

The improved sealing effect is obtained in accordance with this invention by maintaining the annular sealing ring 21 under substantial transverse compression throughout its length in a direction generally diagonally across its corners 27 and 28. This diagonal compression is indicated in Fig. 3 by the opposing arrows drawn to these corners of the ring 21. This is accomplished by shaping the corner between the perpendicular sealing surfaces 22 and 23 of each wheel section so that the corner is non-complemental to the shape of the corners 27 and 28 of the sealing ring. Thus in this embodiment of the invention, the sealing surfaces of each wheel section 10 and 11 are interconnected by an annular corner sealing surface 27' and 28' respectively, and each corner surface 27' and 28' is off-set inwardly from the line in which the planes of the sealing surfaces 22 and 23 would normally intersect. The diagonally opposed corners 27 and 28 of the sealing ring 21, however, are preferably formed at a right angle as shown in Fig. 2. Thus when the wheel sections are assembled with the ring 21, the corners 27 and 28 of the ring are deformed against the corner sealing surfaces 27' and 28', respectively, of the wheel sections so that the ring is placed under appreciable diagonal compression when the tie bolts 12 are tightened.

The cross-sectional shape of the sealing ring 21 is preferably rectangular and nearly square as shown in Fig. 2, having its inner and outer axial faces 22a and 22b slightly wider than its radial faces 23a and 23b. Preferably the corner sealing surfaces 27' and 28' of the wheel sections are formed on a radius in the order of about one-fourth the radial width of the sealing ring.

The radial width of the ring 21 is preferably slightly less than the radial distance between the concentric sealing surfaces 22 of the wheel sections to permit the wheel sections to be assembled conveniently. Although the major compression of the ring is diagonal, the ring is also slightly axially compressed in the assembly, owing to the fact that the axial width of the ring is preferably slightly greater than the axial distance between opposing sealing surfaces 23. Preferably the axial compression is sufficient to bulge the ring surfaces 22a and 22b against sealing surfaces 22 of the wheel sections. The small space intermediate the surface portions 20 of the wheel sections permits part of the rubber material of the ring to flow upwardly from the annular cavity when the wheel sections are fully tightened.

One particular advantage offered by the construction of this invention is that the sealing ring 21 provides an effective seal even though the wheel assembly is subjected to loads tending to separate the wheel sections in an axial direction. In constructions heretofore proposed, a rubber gasket, or O-ring or the like has been merely axial by compression between the wheel sections. The dimensions of such a ring are initially somewhat smaller than the cross sectional area of the cavity in which the ring is positioned so that the surfaces of the ring may be bulged against the cavity by the axial squeezing pressure.

Accordingly, whenever the wheel is subjected to heavy loads, the resulting separation of the wheel sections relieves the axial compression permitting the sealing ring to contract from the walls of its cavity. Consequently, leakage can occur. By maintaining a sealing ring under diagonal compression in accordance with this invention, an effective seal is maintained diagonally across the corners 27, 28 even though the wheel sections would be deflected a substantial distance apart by such loads.

Variations in the construction disclosed may be made within the scope of the appended claims.

I claim:

1. A tubeless tire wheel assembly comprising a pair of complementary wheel sections secured one to the other, said sections having peripheral flanges cooperating to provide axially-spaced bead seats to receive the beads of a tubeless tire mounted on the wheel assembly, an annular surface on each wheel section registering with and abutting the corresponding surface of the other wheel section, annular sealing surfaces on said wheel sections adjacent said abutting surfaces, the sealing surfaces of both wheel sections cooperating to define between said sections an annular cavity communicating with the interface of said abutting registering surfaces and with a region of said peripheral flanges intermediate said bead seats exposed to inflation air of a tubeless tire on the wheel assembly, an endless sealing ring having a rectangular cross-sectional shape and formed of elastically deformable rubber-like material seated in and substantially filling said cavity, said sealing surfaces of each wheel section including a pair of mutually perpendicular sealing surfaces embracing two sides of said sealing ring and an annular corner sealing surface interconnecting said mutually perpendicular sealing surfaces, said corner sealing surface being off-set inwardly from the line of normal intersection of said mutually perpendicular sealing surfaces, said corner sealing surfaces of the sections being located in diagonally opposed relation to each other in the cavity defined by the sealing surfaces of said sections and maintaining said sealing ring throughout its length under appreciable transverse compression oblique to the rotational axis of the wheel across two diagonally opposed corners of the sealing ring by the deformable engagement of said annular corner sealing surfaces of the section with said corners of the sealing ring.

2. A tubeless tire wheel assembly comprising a pair of complementary wheel sections having peripheral rim flanges to receive the beads of tubeless tire, each section having an annular parting surface comprising a first surface portion and a second surface portion laterally offset from said first portion, means for fastening said sections one to the other with said first surface portions of said wheel sections registering with and abutting each other and with said second surface portions apart from each other, and each wheel section further including a pair of mutually perpendicular annular sealing surfaces between said first and said second surface portions and an annular corner sealing surface interconnecting said mutually perpendicular sealing surfaces, said corner sealing surface being off-set inwardly from the normal intersection of the planes of said mutually perpendicular sealing surfaces, said sealing surfaces of the wheel sections cooperating to define an annular cavity having said corner sealing surfaces in diagonally opposite corners of said cavity, an endless sealing ring having a substantially square cross-sectional shape and formed of elastically deformable rubber-like material seated within and substantially filling said cavity, said ring having two diagonally opposed corners engaged with and deformed against said diagonally opposed corner sealing surfaces of said sections to maintain said sealing ring throughout its length under appreciable diagonal transverse compression oblique to the rotational axis of the wheel.

3. A tubeless tire wheel assembly comprising a pair of complementary wheel sections, secured one to the other, said sections having peripheral flanges cooperating to provide axially-spaced bead seats to receive the beads of a tubeless tire mounted on the wheel assembly, said sections having annular mating surfaces registering with and abutting each other, sealing surfaces on each wheel section adjacent said abutting mating surfaces and cooperating to define between said sections an annular cavity communicating with the interface of said registering abutting mating surfaces and with a region of said peripheral flanges intermediate said bead seats, an endless sealing ring of polygonal cross-sectional shape and formed of elastically deformable rubber-like material seated in and substantially filling said cavity, said annular sealing surfaces of each section including a pair of sealing surfaces each adapted to embrace corresponding sides of said sealing ring, said pair of sealing surfaces of one wheel section having an interconnecting annular corner surface spaced axially and radially relative to the rotational axis of the wheel from the corresponding interconnecting annular corner surface of the other wheel section, said annular corner surfaces in said cavity deformably engaging corners of said sealing ring spaced from each other laterally and radially relative to the rotational axis of the wheel to maintain said sealing ring throughout its length under appreciable diagonal transverse compression oblique to the rotational axis of the wheel.

4. A tubeless tire wheel assembly comprising a pair of mating wheel sections having annular registering surfaces, means fastening said sections together with portions of said registering surfaces abutting at an interface communicating with the inflation chamber of a tire supported on the assembly, said registering surface of each wheel section including a pair of mutually perpendicular annular sealing surfaces and an annular corner sealing surface interconnecting said perpedicular sealing surfaces, said sealing surfaces of each section cooperating with corresponding sealing surfaces on the other wheel section to define an annular cavity between said wheel sections, one of said sealing surfaces of each wheel section being disposed radially and the other of said sealing surfaces of each wheel section being disposed axially and concentric relative to the rotational axis of the wheel, said corner surfaces of the cavity being radially and axially offset from each other relative to the rotational axis of the wheel, and an annular elastically deformable sealing ring of rectangular cross-sectional shape in its relaxed state seated in and substantially filling said cavity, said sealing ring having two diagonally opposed corners distorted against said offset corner sealing surfaces throughout the length of said ring and thereby maintained by said corner sealing surfaces under diagonal compression oblique to the rotational axis of the wheel.

5. A tubeless tire wheel assembly comprising a pair of mating wheel sections having annular registering surfaces, means fastening said sections together with portions of said registering surfaces abutting at an interface communicating with the inflation chamber of a tire supported on the assembly, said registering surface of each wheel section including sealing surfaces which mate in the assembly with corresponding sealing surfaces of the opposing wheel section to define an annular cavity between said wheel sections, an annular elastically deformable sealing ring having in its relaxed state a polygonal cross-section shape, the ring being positioned in the cavity with at least two of the corners of the ring being radially and axially offset from each other relative to the rotational axis of the wheel and the ring substantially filling said cavity, and said sealing surfaces defining said cavity including two corner surfaces radially and axially offset from each other relative to the axis of the wheel against which corner surfaces said corners of the ring are deformably engaged whereby said ring is maintained under diagonal compression oblique to the rotational axis of the wheel.

References Cited in the file of this patent

UNITED STATES PATENTS

| | | |
|---|---|---|
| 2,638,243 | Davies | May 12, 1953 |
| 2,661,120 | Miller | Dec. 1, 1953 |
| 2,688,497 | Brisack | Sept. 7, 1954 |

FOREIGN PATENTS

| | | |
|---|---|---|
| 1,098,290 | France | Mar. 2, 1955 |